US006067007A

United States Patent [19]

Gioia

[11] Patent Number: 6,067,007

[45] Date of Patent: May 23, 2000

[54] METHOD AND APPARATUS FOR DETECTION, NOTIFICATION AND LOCATION OF VEHICLE THEFT

[75] Inventor: Thomas A. Gioia, Plymouth, Mich.

[73] Assignee: Ford Motor Company, Dearborn, Mich.

[21] Appl. No.: 09/285,909

[22] Filed: Apr. 2, 1999

[51] Int. Cl.[7] ........ B60R 25/10

[52] U.S. Cl. ........ 340/426; 340/825.3; 307/10.3; 180/287

[58] Field of Search ........ 340/426, 425.5, 340/825.3, 825.31, 825.32, 825.34; 307/10.2, 10.3, 10.5; 180/287

[56] References Cited

U.S. PATENT DOCUMENTS

| | | | |
|---|---|---|---|
| 4,754,255 | 6/1988 | Sanders et al. . | |
| 4,965,460 | 10/1990 | Tanaka et al. | 307/10.2 |
| 5,014,206 | 5/1991 | Scribner et al. . | |
| 5,223,844 | 6/1993 | Mansell et al. . | |
| 5,334,974 | 8/1994 | Simms et al. . | |
| 5,497,149 | 3/1996 | Fast . | |
| 5,515,285 | 5/1996 | Garrett, Sr. . | |
| 5,550,551 | 8/1996 | Alesio . | |
| 5,576,716 | 11/1996 | Sadler . | |
| 5,673,305 | 9/1997 | Ross . | |
| 5,682,133 | 10/1997 | Johnson et al. . | |
| 5,703,598 | 12/1997 | Emmons . | |
| 5,731,785 | 3/1998 | Lemelson et al. . | |
| 5,793,283 | 8/1998 | Davis . | |
| 5,796,178 | 8/1998 | Onuma . | |
| 5,838,251 | 11/1998 | Brinkmeyer et al. | 340/825.31 |

*Primary Examiner*—Jeffery A. Hofsass
*Assistant Examiner*—Sihong Huang
*Attorney, Agent, or Firm*—Mark Mollon

[57] ABSTRACT

A security system for an automotive vehicle including a positioning device which, in cooperation with a Global Positioning System ("GPS") satellite network provides location information regarding the vehicle's position. The security system further includes a passive operator identification device having a first security code and a theft control unit including memory storing a second security code. The passive operator identification device and the theft control unit work together to ensure the vehicle operator is authorized to operate the vehicle. An event detector communicates with the theft control unit to provide an event signal associated with the vehicle such as vehicle movement. If an event signal is received by the theft control unit, and the first and second security codes are not equal, the theft control unit communicates the vehicle position as determined by the position detector to a monitoring station. The monitoring station could be the local police department, a security service firm, or the vehicle owner's residence, for instance.

20 Claims, 2 Drawing Sheets

METHOD AND APPARATUS FOR DETECTION, NOTIFICATION AND LOCATION OF VEHICLE THEFT

TECHNICAL FIELD

The present invention relates generally to security devices for automotive vehicles, and more specifically, to a method and apparatus for detecting vehicle theft and reporting and monitoring the location of the vehicle in the event a theft occurs.

BACKGROUND

A number of devices have been developed to address the problem of motor vehicle theft. Some of these devices are mechanical devices while others are electronic alarm systems. Mechanical anti-theft devices include steering wheel locks which prevent the steering wheel from being turned so that the car cannot be driven. Electronic alarm systems include systems having a controller mounted in the vehicle which is activated by a switch or a code. In such systems, the alarm reacts if the vehicle is entered or started without deactivating the alarm. Other electronic security systems provide a radio transmitter within the vehicle which, after the vehicle is reported stolen, is activated to provide tracking and location information of the vehicle to law enforcement authorities or the vehicle owner, for example.

One drawback with prior security devices is the potential for long delays between the time the vehicle was stolen and the time the theft is reported. Typically, with the mechanical or electrical theft deterrent systems just described, some affirmative action is required of the vehicle owner to report the vehicle theft.

In addition, vehicle theft deterrent systems of the type just described typically require affirmative action by the vehicle operator to de-activate the security system before operating the vehicle. Mechanical devices require disassembly and electronic theft deterrent systems typically require the operator to enter a security code or toggle a switch to deactivate the alarm.

SUMMARY OF THE INVENTION

An object of the present invention is to provide an improved vehicle security, system.

Another object of the invention is to eliminate the delay between the time the vehicle is stolen and the time the theft is resorted to the proper authorities.

A further object is to passively active and deactivate the theft deterrent system.

According to the present invention, the foregoing and other objects and advantages are attained by a security system for an automotive vehicle including a positioning device which, in cooperation with a Global Positioning System ("GPS") satellite network provides location information regarding the vehicle's position. The security system further includes a passive operator identification device having a first security code and a theft control unit including memory storing a second security code. The passive operator identification device and the theft control unit work together to ensure the vehicle operator is authorized to operate the vehicle. An event detector communicates with the theft control unit to provide an event signal associated with the vehicle such as vehicle movement. If an event signal is received by the theft control unit, and the first and second security codes are not equal, the theft control unit communicates the vehicle position as determined by the position detector to a monitoring station. The monitoring station could be the local police department, a security service firm, or the vehicle owner's residence, for instance.

In another aspect of the present invention, the theft control unit disables the engine in addition to communicating the vehicle position to a monitoring station, if an event signal is received and the first and second security codes are not the same.

One advantage of the present invention is that unauthorized operation or movement of a vehicle is reported immediately as well as the vehicle position and identification.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention.

In the drawings.

DESCRIPTION OF THE PREFERRED EMBODIMENT

Figure 1:
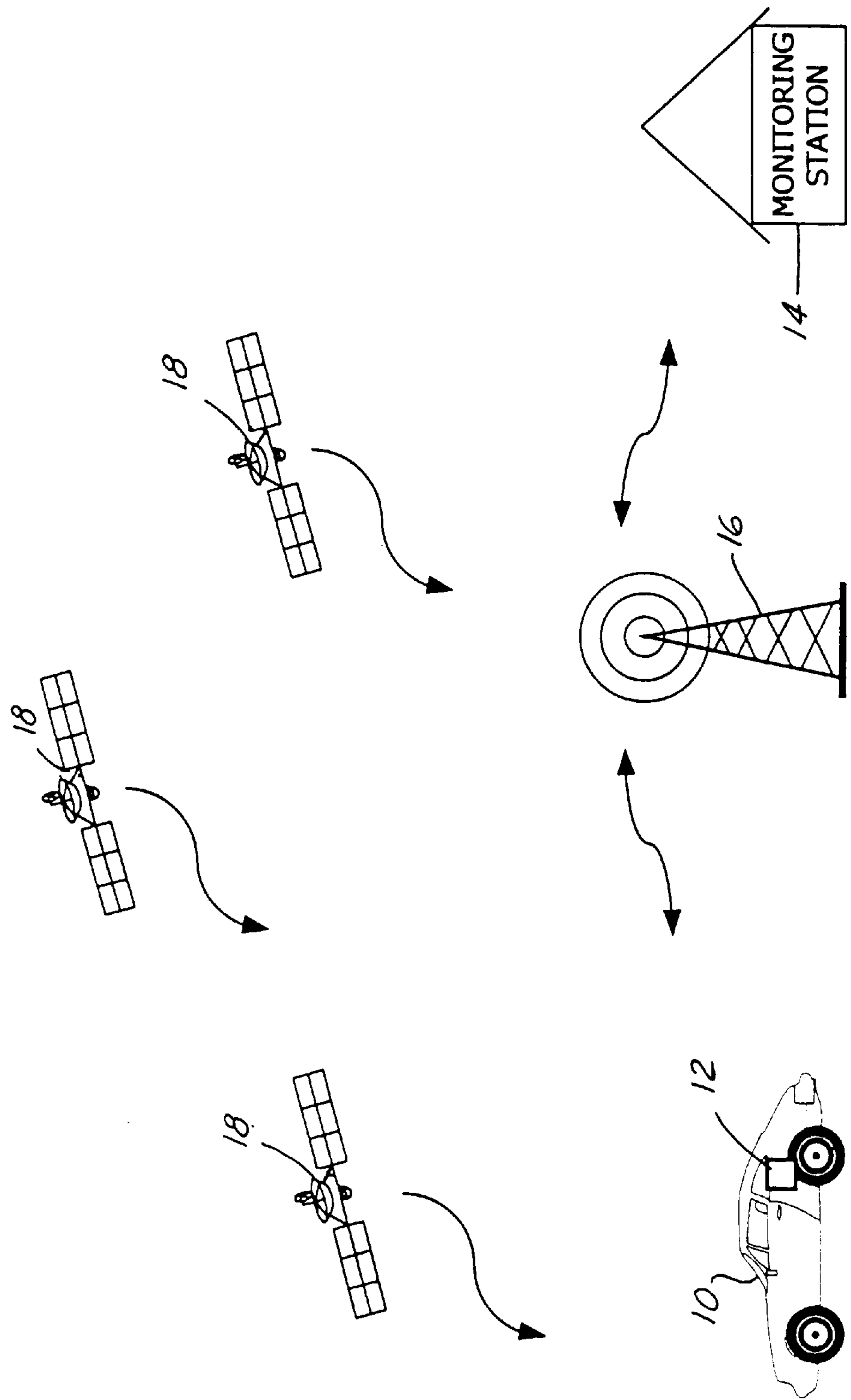
FIG. 1 is a schematic diagram of one embodiment of the security system according to the present invention.

Referring to FIG. 1, there is shown a schematic view of one vehicle 10 equipped with a security system 12 according to one embodiment of the present invention. A central monitoring station 14 is located remotely from the vehicle 10. A communications tower 16 such as a cellular telephone tower, links the vehicle 10 with the monitoring station 14. Although only one vehicle 10 is shown in FIG. 1, there is no limit to the number of vehicles which may be protected by the security system constructed as described herein. Similarly, multiple monitoring stations and communications towers, for example, serving different geographic regions, is also within the scope of the present invention.

Preferably, the vehicle location is monitored from the existing GPS satellite network which provides a highly accurate, real-time vehicle location data. The GPS includes a constallation of radio-navigation satellites 18 which continuously transmit precise timing and location information to substantially the entire surface of the earth. The position detector located in security system 12 preferably acquires several transmissions from a corresponding plurality of GPS satellites 18. This allows the security system 12 to determine the location of the vehicle, velocity, and direction of motion, for possible transmission to the monitoring station 14.

Figure 2:
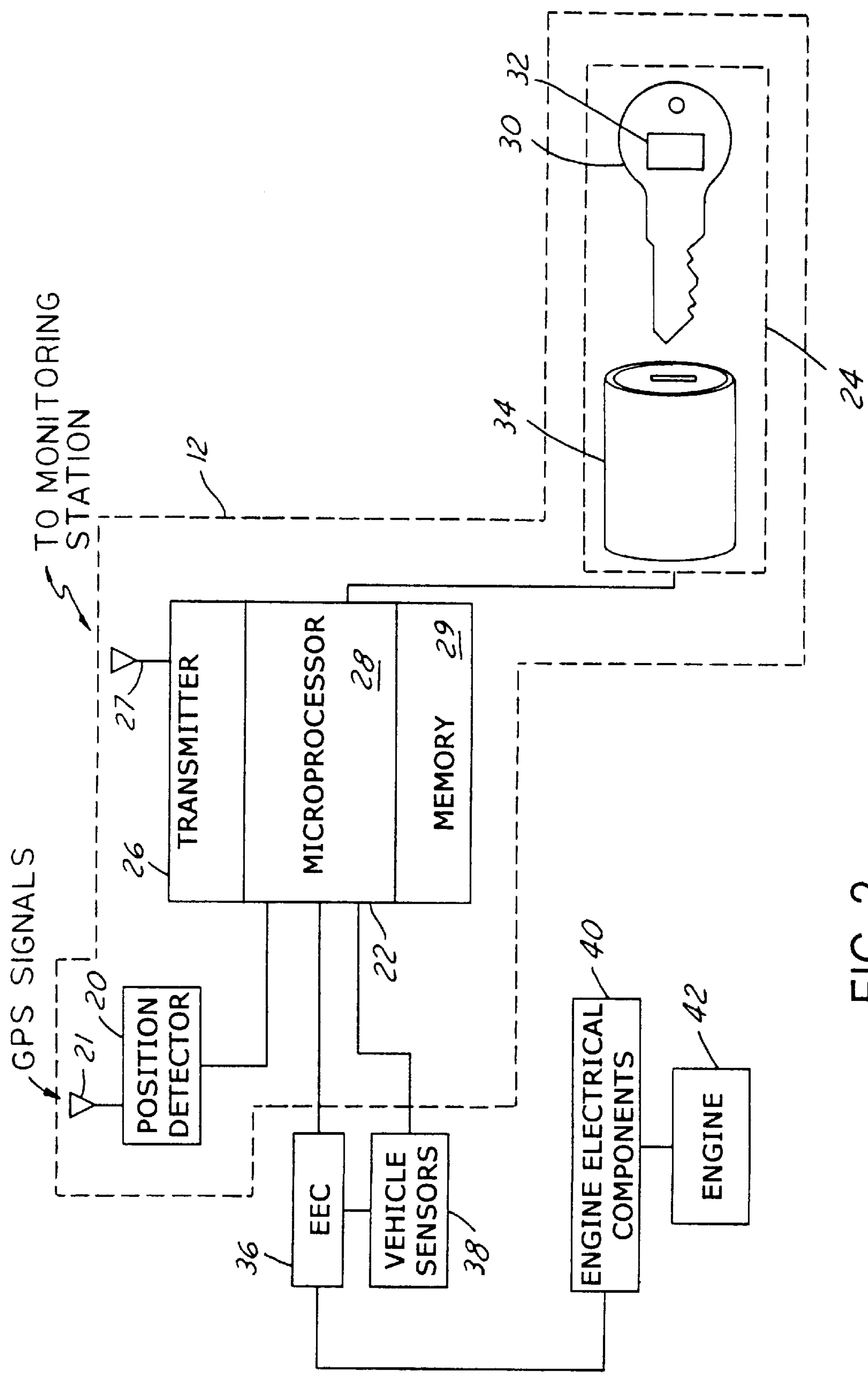
FIG. 2 is a block diagram of the components of the security system of FIG. 1.

Referring to FIG. 2, here is shown a block diagram of the components of security system 12 shown in FIG. 1. The security system 12 includes a position detector 20, a theft control unit 22 and a passive operator identification device 24. The position detector 20 is preferably a GPS receiver which includes an antenna 21 for receiving GPS signals from the GPS satellites 18 (FIG. 1).

The theft control unit 22 includes a transmitter 26 having an antenna 27 for communicating with the monitoring station 14 (FIG. 1). The theft control unit 22 also includes a logic device such as a microprocessor 28 for executing logic stored in memory 29 to determine when unauthorized use or movement of the vehicle has occurred. Memory 29 also includes an encoded digital security code which is unique to each security system 12. Memory 29 is preferably a read only memory.

The passive operator identification device 24 is preferably a data key system such as the Ford Motor Company Passive Anti-Theft System (PATS) or equivalent. In such a system, a key 30 include, an electronic memory device which stores a unique security code. Preferably, the electronic memory device is a transponder 32. Key 30 is used to operate a lock switch 34 which, for example, has at least two operating positions, e.g., an "off" and an "on" position. Lock switch 34 can also provide several positions commonly used in ignition switches such as a start position and an accessory position. When the key 30 is coupled to the lock switch 34 and the switch is in the "on", the transponder 32 is energized to transmit the security code associated with the key to the theft control unit 22. The theft control unit 22 then compares the security code received from the transponder 32 to the security code stored in memory 29. If the received security code is not equal to the security code stored in memory 29 of the theft control unit 22, then an unauthorized operator identification flag is set.

The theft control unit 22 also communicates with the electronic engine controller 36 and receives inputs from vehicle sensors 38 either directly or through the EEC 36. Security system 12 preferably operates with vehicle sensors commonly found on vehicles and, therefore, does not require additional componentry to operate. Such sensors can include motion sensors which signal engine RPM or wheel RPM. The electronic engine controller 36 powers the engine running electrical components 40 such as fuel injectors, the fuel pump and the ignition system. By operating these components, the electronic engine controller 36 can disable the engine 42.

Under normal operating conditions, the key 30 is inserted into the lock switch 34 and rotated to the "on" position (or a start position) which provides power to the theft control unit 22 and electronic engine controller 36. If, for example, the security system 12 is programmed to respond to the engine running, then the vehicle sensor 38, such as an RPM indicator, communicates to the theft control unit 22 directly that the engine is running. Alternatively, vehicle sensor 38 communicates indirectly to the theft control unit 22 via the electronic engine controller 36 that the engine is running. Once the predetermined event signal is received by the theft control unit 22, the status of the operator identification flag is checked. This flag is set if the security code associated with the key 30 does not match the security code contained in memory 29 of the theft control unit 22, and it is cleared if the two security codes are the same.

Thus, if an event signal is received from vehicle sensor 38, and the passive operator identification device 24 indicates that an authorized user is operating the vehicle, the vehicle is operating under normal conditions and no alarm event is indicated. If, however, an event signal is received by the theft control unit 22, and the security code provided by the passive operator identification device 24 is not detected or does not match the security code contained in memory 29, an alarm condition is indicated. When an alarm condition is indicated, vehicle location information is determined from position detector 20 is communicated via the transmitter 26 to the monitoring station 14. The position information can be transmitted to the monitoring station directly by radio frequency transmission. Preferably, the position information is transmitted to the monitoring station over an existing communications network such as a cellular telephone network represented by cellular telephone transmission tower 16 in FIG. 1. Monitoring station 14 can be a police dispatch center, the vehicle owner's residence, or a security monitoring service. Preferably, memory 29 also includes vehicle identification information which is transmitted along with the position information to allow the vehicle to be identified and returned to its proper owner. Such information can include the vehicle make, model and serial number as well as owner identification information.

In the event of an alarm signal, security system 12 can also disable the engine 42 by communicating the alarm signal to the electronic engine control module 36 which controls the engine electrical components 40.

From the foregoing, it will be seen that there has been brought to the art a new and improved vehicle security system which overcomes the drawbacks associated with prior systems. While the invention has been described in connection with one or more embodiments, it will be understood that the invention is not limited to those embodiments. On the contrary, the invention covers all alternatives, modifications, and equivalents, as may be included within the spirit and scope of the appended claims.

What is claimed is:

1. A security system for an automotive vehicle comprising:

- a position detector responsive to navigation signals transmitted by a satellite navigation system and providing location information regarding the vehicle's position based on the navigation signals;
- a passive operator identification device including a first security code;
- an event detector for providing an event signal associated with the vehicle; and
- a theft control unit including memory storing a second security code, the theft control unit, responsive to the event signal, operative to communicate the vehicle position to a monitoring station upon the occurrence of the event signal if the first and second security codes are not equal.

2. The security system of claim 1 wherein the event detector is a motion sensor and the event signal is indicative of vehicle movement.

3. The security system of claim 1 wherein the event detector is an engine sensor and the event signal is indicative of an engine start command.

4. The security system of claim 1 wherein the theft control unit communicates with the monitoring station via radio frequency transmissions.

5. The security system of claim 1 wherein the theft control unit communicates with the monitoring station via a cellular telephone communications network.

6. The security system of claim 1 wherein the theft control unit memory further includes vehicle identification information which, upon the occurrence of the event signal if the first and second security codes are not equal, is communicated with the vehicle position information to the monitoring station.

7. The security system of claim 1 wherein the passive operator identification device is a key having a transponder, said transponder retaining said first security code said first security code being a unique digitally encoded signal.

8. A security system for an automotive vehicle having an engine operatively connected to engine running electrical components comprising:

- a position detector responsive to navigation signals transmitted by a GPS satellite network the position detector providing location information regarding the vehicle's position based on the navigation signals;

a passive operator identification device including a first security code;

an event detector for providing an event signal associated with the vehicle; and a theft control unit including a transmitter and memory storing a second security code, the theft control unit operative to communicate the vehicle position to a monitoring station upon the occurrence of an event signal if the first and second security codes are not equal and disconnect the engine running electrical components thereby disabling the engine.

9. The security system of claim 8 wherein the event detector is a motion sensor and the event signal is indicative of vehicle movement.

10. The security system of claim 8 wherein the event detector is an engine sensor and the event signal is indicative of the engine running.

11. The security system of claim 8 wherein the passive operator identification device is a lock switch operator having a memory device containing said first security code.

12. The security system of claim 11 wherein said first security code is a unique digitally encoded signal.

13. The security system of claim 7 wherein said theft control unit memory further includes vehicle identification information which, upon the occurrence of the event signal if the first and second security codes are not equal, is communicated with the vehicle position information to the monitoring station.

14. A method for operating a security system for an automotive vehicle having an engine, said security system having a position detector for determining the position of the vehicle in response to navigation signals transmitted by a GPS satellite network, a passive operator identification device including memory containing a first security code, and a theft control unit including a transmitter and memory storing a second security code, the method comprising the steps of:

detecting an event signal associated with the vehicle;

comparing said first security code with said second security code; and if said first and second security codes are not equal, communicating the vehicle position to a monitoring station.

15. The method of claim 14 wherein said passive operator identification memory further includes vehicle identification information, the method further including the step of communicating the vehicle identification information with said vehicle position information to a monitoring station.

16. The method of claim 14 wherein the step of detecting an event signal includes detecting vehicle movement.

17. The method of claim 14 wherein the step of detecting an event signal includes detecting an engine start signal.

18. The method of claim 14 wherein the step of communicating the vehicle position to a monitoring station includes establishing a communications link with said monitoring station via a cellular telephone network and continuously transmitting said vehicle position data to said monitoring station.

19. The method of claim 14 wherein the step of communicating the vehicle position to a monitoring station includes establishing a communications link with said monitoring station via a cellular telephone network and periodically transmitting said vehicle position data to said monitoring station.

20. The method of claim 14 further comprising the step of disabling the engine if said first and second security codes are not equal.

* * * * *